US009491928B1

(12) United States Patent
Mills

(10) Patent No.: US 9,491,928 B1
(45) Date of Patent: Nov. 15, 2016

(54) ILLUMINATED SCRATCH POST

(71) Applicant: If Industries, LLC, Jefferson, LA (US)

(72) Inventor: Jacob C. Mills, Jefferson, LA (US)

(*) Notice: Subject to any disclaimer, the term of this patent is extended or adjusted under 35 U.S.C. 154(b) by 0 days.

(21) Appl. No.: 14/752,648

(22) Filed: Jun. 26, 2015

(51) Int. Cl.
| A01K 15/02 | (2006.01) |
| F21V 23/04 | (2006.01) |
| F21V 33/00 | (2006.01) |
| H05B 33/08 | (2006.01) |
| F21Y 101/02 | (2006.01) |

(52) U.S. Cl.
CPC ......... *A01K 15/024* (2013.01); *F21V 23/0435* (2013.01); *F21V 23/0471* (2013.01); *F21V 23/0492* (2013.01); *F21V 33/008* (2013.01); *H05B 33/0851* (2013.01); *H05B 33/0896* (2013.01); *F21Y 2101/02* (2013.01)

(58) Field of Classification Search
CPC .............................. A01K 15/02; A01K 15/00
USPC ................................................ 119/706, 705
See application file for complete search history.

(56) References Cited

U.S. PATENT DOCUMENTS

| 4,177,763 A | 12/1979 | Cook |
| D386,839 S | 11/1997 | Jennus |
| 6,666,167 B1 * | 12/2003 | Carlson ............... A01K 15/024 119/54 |
| 8,894,233 B2 | 11/2014 | Van Herpen et al. |
| 2004/0194731 A1 * | 10/2004 | Lineberry ........... A01K 15/024 119/706 |

OTHER PUBLICATIONS

The Carpet and Rug Institute, Understanding Carpet, site last visited May 14, 2015.
World Floor Covering Association, Carpet Construction, site last visited May 14, 2015.
Advanced Textiles Source, Philips and Desso to develop light-transmissive carpets, Dec. 10, 2013.

* cited by examiner

*Primary Examiner* — Minh D A
(74) *Attorney, Agent, or Firm* — Baird Holm LLP; AriAnna C. Goldstein

(57) ABSTRACT

An illuminated scratch post is disclosed comprising a housing and an integrated lighting device. The housing includes a central lighting support with one or more lighting elements disposed thereon from the integrated lighting device. The central lighting support is encased by a light transmissive substrate also comprising the housing. Further, the housing has an outer surface covered, at least in part, by a light transmissive material.

20 Claims, 7 Drawing Sheets

ILLUMINATED SCRATCH POST

BACKGROUND OF THE INVENTION

Cats and other household pets play and interact with scratching posts as a form of entertainment and alternative to the pets scratching furniture and fixtures. Scratch posts typically comprise some base along with one or more posts, platforms, and/or housings that cats and other pets can claw, climb, and stand upon. Furthermore, scratch posts commonly use carpeting covering their underlying frames (or structures) to provide a durable and texturized material for cats and other pets to feel when they play and interact with the posts.

Scratch posts often differ in their underlying structure and even in the color of their carpet coverings. However, scratch posts may not immediately attract a cat's attention and can require training to teach a cat to play or interact with the posts. Also problematic is the fact that many scratch posts lack aesthetic or ambient appeal as visible items in pet owners' homes.

SUMMARY OF THE INVENTION

An illuminated scratch post is disclosed. The illuminated scratch post comprises a housing and an integrated lighting device. The illuminated scratch post produces light that may attract a cat's or other household pet's attention. The illuminated scratch post may also produce ambient lighting for a room where the illuminated scratch post is placed.

It is to be understood that both the foregoing general description and the following detailed description are exemplary and explanatory only and are not necessarily restrictive of the disclosure as claimed. The accompanying drawings, which are incorporated in and constitute a part of the specification, illustrate embodiments of the disclosure and together with the general description, serve to explain the principles of the disclosure.

BRIEF DESCRIPTION OF THE FIGURES

The numerous advantages of the present disclosure may be better understood by those skilled in the art by reference to the accompanying figures in which.

DETAILED DESCRIPTION

Figure 1:
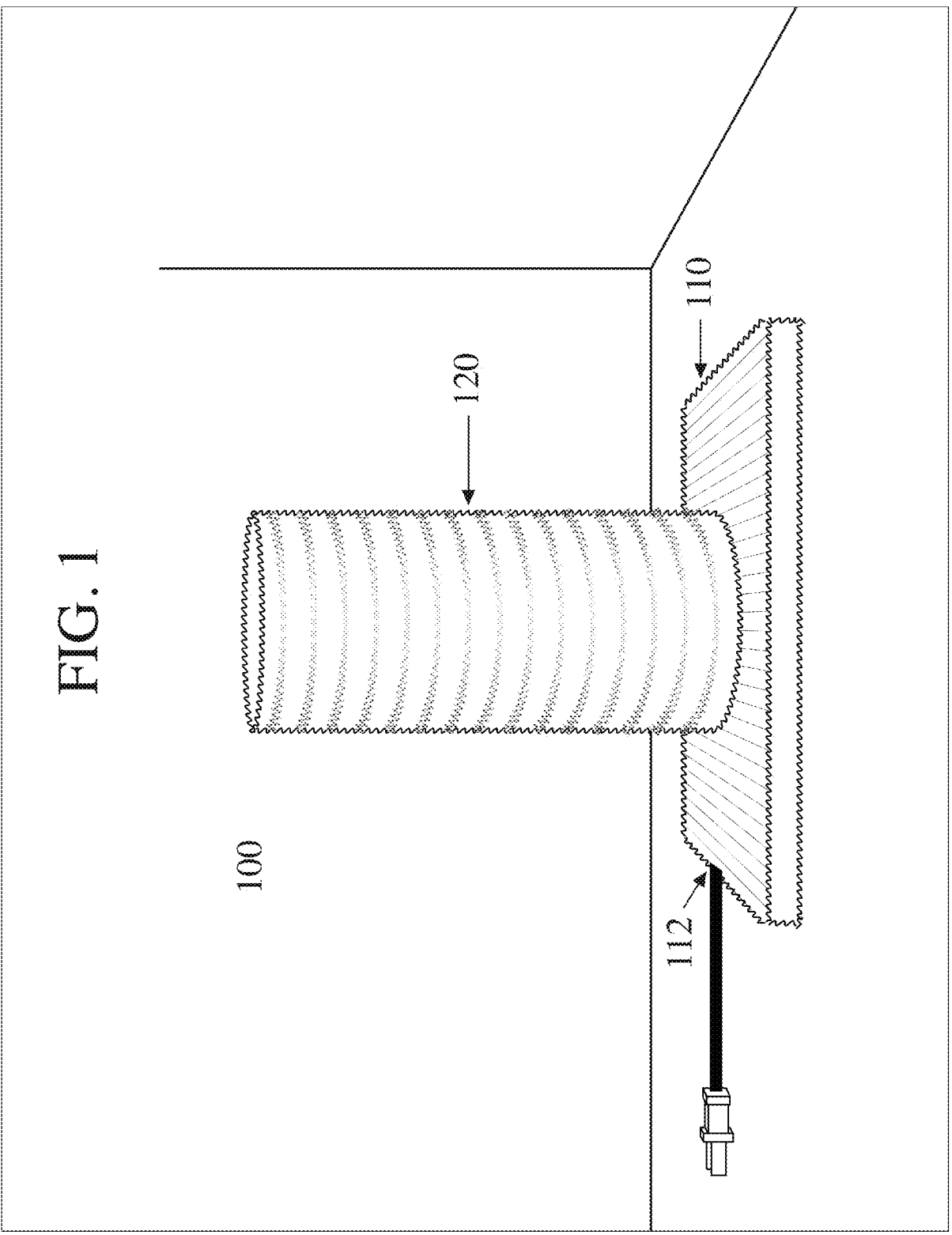
FIG. 1 is an exterior perspective view of the illuminated scratch post.
Figure 2A:
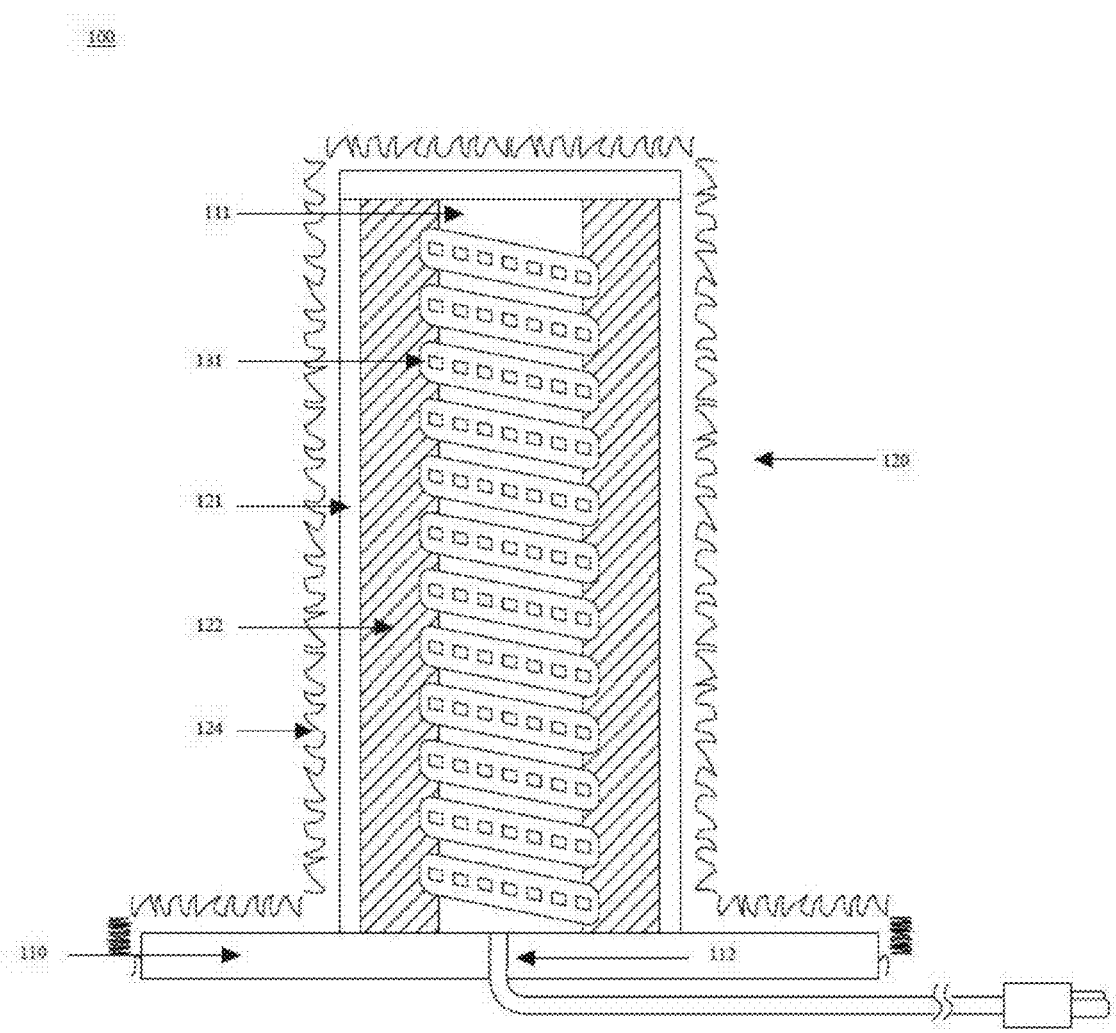
FIG. 2A is an interior cross-sectional side view of the illuminated scratch post.

The present disclosure describes an illuminated scratch post for a cat or other household pet to play and/or interact with. Referring to FIG. 1 and FIG. 2A, the illuminated scratch post 100 comprises a housing 120 and an integrated lighting device 130. As seen in the embodiment of FIG. 1, the illuminated scratch post may also comprise a base 110 that is a rectangular prism acting as a foundation for the housing 120; in other embodiments, the base 110 may be other shapes (e.g., a three-dimensional disk). For example, the base 110 may comprise a set of legs (e.g., a tripod or table construction) as a foundation in combination with another construction as the housing 120.

In some embodiments of the illuminated scratch post 100, there is no need for a base 110 because the housing 120 may be another shape or combination of shapes and constructions, as well as a variety of sizes, that provide the necessary foundation for the housing 120 to stand upright on the surface where the illuminated scratch post is set. For example, in one embodiment, the housing 120 may be a cube or box-like shape, thereby eliminating the need for a separate foundation, as compared to the embodiment of FIG. 1. In another example, the housing 120 may be a cylinder or drum with a wide enough diameter to eliminate the need for a separate foundation, as compared to the embodiment of FIG. 1.

In embodiments of the illuminated scratch post 100 such as the one seen in FIG. 1, the housing 120 may be attached to a surface of the base 110 by adhering, securing or fastening means. For example, the housing 120 may screw onto a surface of the base 110 using a threaded connection between an externally threaded headed fastener extending down and out of a bottom surface of the housing 120 into an internally threaded receiving end accessible from the top surface of the base 110.

The housing 120 includes a central lighting support 111 secured to a surface of the housing 120 (e.g., an interior support surface). The central lighting support 111 is encased (or enclosed) by the sides of the housing 120. In embodiments, the central lighting support 111 may align with a center of the housing 120. The central lighting support 111 may be a cylinder, rectangular prism, or other shape.

Figure 3:
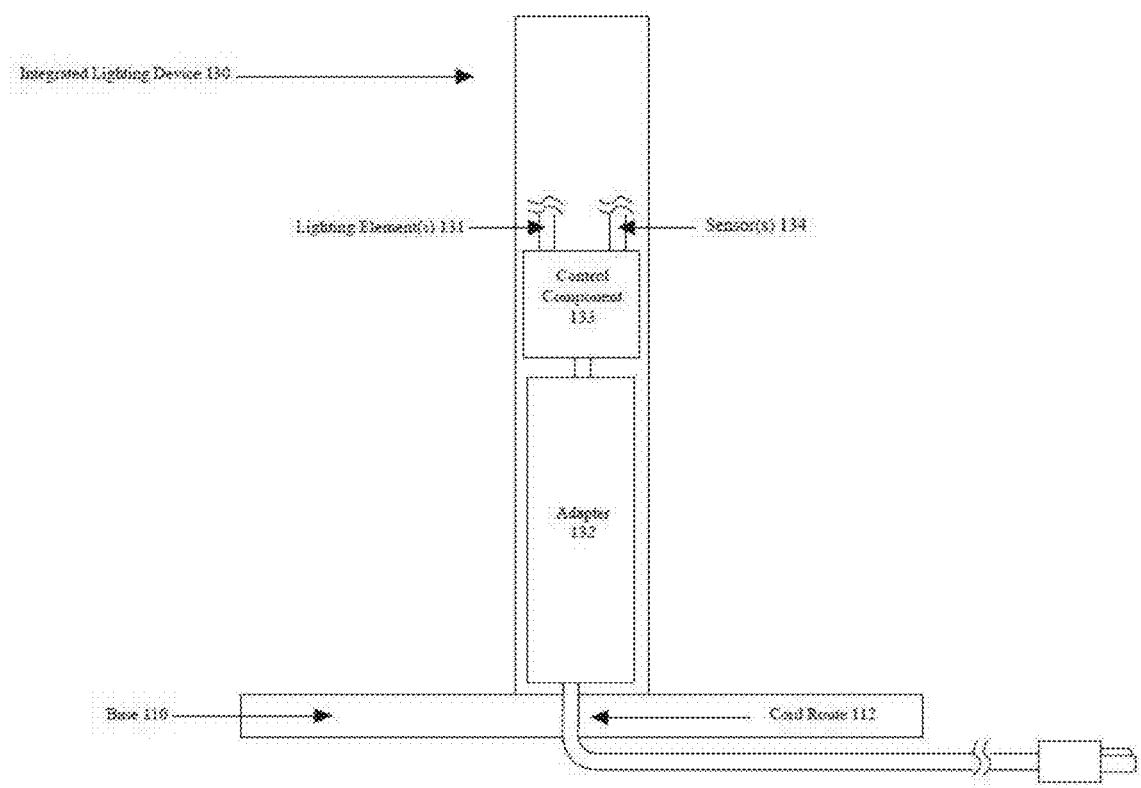
FIG. 3 is an interior cross-sectional side view of components to the integrated lighting device for the illuminated scratch post.

The integrated lighting device 130 is also disposed on a surface of the housing 120 (e.g., an interior device surface), as seen in FIG. 3. The integrated lighting device 130 is at least partially encased (or enclosed by) the housing 120. Further, referring to FIG. 2A, the integrated lighting device 130 may also be at least partially encased by (or housed within) the central lighting support 111, which is a component part of the housing 120. The central lighting support 111 may be configured to enable the passage of electrical wiring and other components through the support 111 to connect with and/or between components of the integrated lighting device 130. The central lighting support 111 may also be constructed of material selected for properties related to heat resistance, sturdiness (or rigidity), and/or low electrical interference with respect to wireless signal transmission and receipt.

In an exemplary embodiment, the central lighting support 111 may be configured to receive one or more lighting elements 131 from the integrated lighting device 130. For instance, the central lighting support 111 may have grooves etched or molded into its surface. The grooves may be sized and shaped to fit the one or more lighting elements 131, such as a series of LEDs disposed upon a substrate (e.g., a strip or band of LEDs), which may set within and be secured to the groove. The one or more lighting elements 131 may be secured within the grooves using, for example, means for fastening or means for adhesion. Alternatively, the central lighting support 111 may have an arranged series of apertures or internally threaded receiving ends on its surface.

The one or more lighting elements 131 may be a series of LEDs disposed upon a substrate that may be fastened or secured to the central lighting support 111 using the arranged series of apertures or internally threaded receiving ends. In yet another embodiment, the central lighting support 111 may be of a material or have material disposed thereon that enables the one or more lighting elements 131 to be adhered to the support 111 (e.g., using Velcro or a chemical adhesive between the surface of the support 111 and an underside of the lighting elements 131).

The one or more lighting elements 131 may be a variety of types of light sources. As provided above, in one embodiment, the lighting elements 131 may comprise a plurality of LEDs. The term LED may also refer to OLED (i.e., organic light-emitting diode). More generally, LED may refer to solid state lighting. In another embodiment, the lighting elements 131 may comprise light sources that are a plurality of small incandescent lamps. In another embodiment, the lighting elements 131 may comprise light sources that are electroluminescent wire(s) (also known as "EL wires"). These exemplary lighting sources are not meant to be exhaustive and other light source types may be used for the lighting elements 131.

The one or more lighting elements 131 may be a variety of arranged light sources. In one embodiment, the one or more lighting elements 131 may be a strip or band of light sources (e.g., LEDs). In another embodiment, the one or more lighting elements 131 may be a plurality of strips or bands of light sources. In another embodiment, the one or more lighting elements 131 may be a matrix of light sources, such as LEDs arranged and connected on a rectangular and substantially flat substrate. In any such embodiment, each of the light sources comprising a lighting element 131 may be connected in series, in parallel, or in some combination thereof.

In embodiments, the housing 120 (and/or base 110) may include a cord route 112. The cord route 112 allows for electrical wiring or cords to pass through the housing 120 and/or base 110 from, for instance, an electrical wall socket to the integrated lighting device 130, where the integrated lighting device 130 may be secured to the housing 120. The cord route 112 may be paired or fitted, in some embodiments, with a grommet to further protect the integrity of the wiring or cords that pass through the housing 120 and/or base 110 using the cord route 112.

Figure 2B:
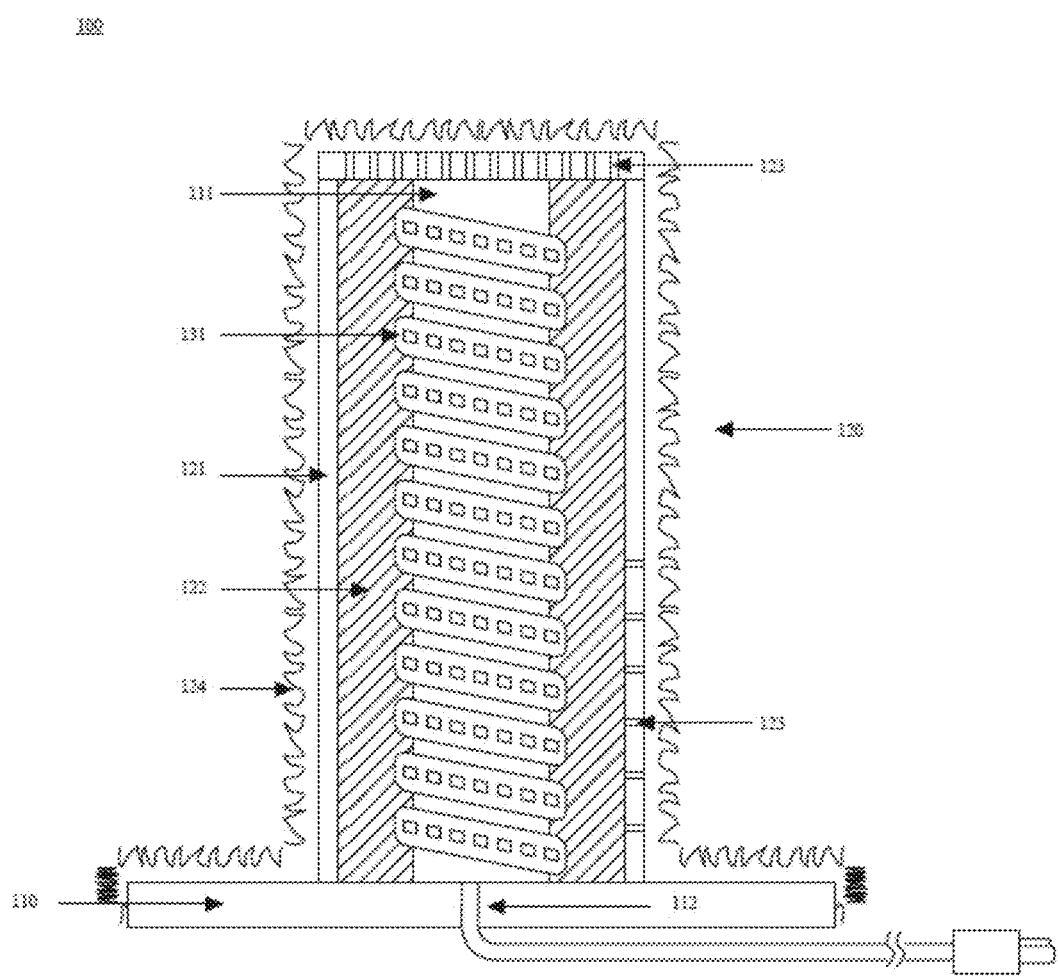
FIG. 2B is another embodiment of an interior cross-sectional side view of the illuminated scratch post.

Referring to FIGS. 2A and 2B, the housing 120 also comprises a light transmissive substrate 121. The light transmissive substrate 121 may define the shape and structure to the housing 120, including a center of the housing 120. The shape and structure defined by the light transmissive substrate 121 is a volumetric form. Thus, the light transmissive substrate 121 may take a variety of shapes (e.g., cylinder). In a preferred embodiment, the height of the light transmissive substrate 121 for the housing 120 correlates with the height of the central lighting support 111. This preferred embodiment is apparent in FIGS. 2A and 2B, where a surface of the central lighting support 111 may contact a surface of the light transmissive substrate 121.

Furthermore, in some embodiments, the light transmissive substrate 121 is transparent to permit light to pass through material comprising the light transmissive substrate 121. In other embodiments, the light transmissive substrate 121 is translucent to permit some light to pass through material comprising the light transmissive substrate 121. Relatedly, in some embodiments, the light transmissive substrate 121 is finished with a frosted surface (e.g., frosted glass) to provide a level of diffusion when light passes through material comprising the light transmissive substrate 121. Further, in some embodiments, the light transmissive substrate 121 is finished with a tint (e.g., tinted glass) to affect the amount (or intensity) of light escaping passage through material comprising the light transmissive substrate 121. The light transmissive substrate 121 may be comprised of plastic, glass, fiberglass, a mesh material, or a combination thereof.

As seen in the embodiments of FIGS. 2A and 2B, the light transmissive substrate 121 may define a hollow inner volume 122 providing a space between outer vertical sides of the central lighting support 111 and inner vertical sides of the light transmissive substrate 121. In another embodiment, there may be little to no space between the outer vertical sides of the central lighting support 111 and the inner vertical sides of the light transmissive substrate 121. For example, the outer vertical sides of the central lighting support 111 may contact the inner vertical sides of the light transmissive substrate 121.

Whether the hollow inner volume 122 is provided and, if so, the amount of space comprising that volume 122 may be determined based on a variety of factors. For example, one factor may be the heat generated by any portion of the encased integrated lighting device 130. Relatedly, another factor may be the heat transferability and ventilation properties of the housing 120 (and, as applicable, the central lighting support 111) encasing at least a portion of the integrated lighting device 130. Another factor may be the durability and scratch resistance of a light transmissive material 124 (defined below) covering an outside surface of the light transmissive substrate 121. Another factor may be the lumens (i.e., amount of light) produced by the one or more lighting element(s) 131 of the integrated lighting device 130.

In another embodiment seen in FIG. 2B, the light transmissive substrate 121 may also include one or more ventilation arrangements 123. A ventilation arrangement 123 may be a series of apertures formed from a top surface through a bottom surface of the light transmissive substrate 121, where the series may be a row of apertures, a column of apertures, or a combination thereof. A ventilation arrangement 123 may be located on any part of the light transmissive substrate 121 (e.g., on a portion of a vertical side to the light transmissive substrate 121). Each ventilation arrangement 123 may improve the safety of the illuminated scratch post 100 by improving the paths for heat to escape, as generated by any portion of the integrated lighting device 130 encased by the housing 120 (and, where applicable, the central lighting support 111).

The light transmissive substrate 121 may also serve as the underlying support for a light transmissive material 124 to be disposed. In a preferred embodiment, the light transmissive material 124 is light transmissive carpet. In another preferred embodiment, the light transmissive material 124 is durable and scratch resistant (i.e., capable of withstanding scratches, scraping, rubbing, kneading, or other frictional forces such as those from a cat or other household pet). The light transmissive material 124, in combination with the light transmissive substrate 121, may provide protection against scratching and the like against the one or more lighting elements 131, particularly in the embodiment where the outer vertical sides of the central lighting support 111 are very close to or contact the inner vertical sides of the light transmissive substrate 121.

The light transmissive material 124 allows at least part of the light generated by lighting elements 131 of the integrated lighting device 130 to penetrate through the material. The light passing through the light transmissive substrate 121 and the light transmissive material 124 may create an ambient lighting (or glow) from the illuminated scratch post 100 for the room or space where the post 100 is kept. The light transmissive material 124 also allows at least part of any heat generated by the lighting elements 131 to pass through the material. The one or more layers to the light transmissive material 124 affect light penetration, durability and scratch resistance, and/or heat transfer.

The light transmissive material 124 may have a primary backing; additionally, the light transmissive material 124 may also have a secondary backing. The primary backing is a substrate for pile fibers (e.g., nylon, polyester, polypropylene (olefin), triexta, or wool) to be secured to a top surface of the substrate using a chemical adhesive or bonding agent (e.g., synthetic latex). The secondary backing is a substrate that may be secured to a bottom surface of the primary backing using a chemical adhesive or bonding agent, where the secondary backing may provide pile fiber stability and/or durability.

Each of the primary backing and the secondary backing may be a material such as polypropylene, nylon, or jute. Further, each of the primary backing and the secondary backing may comprise woven constructions, thereby making each backing at least partially penetrable by or permeable to the passage of light (i.e., there is sufficient spacing between fibers and/or other substrate material to allow the passage of light through such spacing).

Pile fibers may be yarns forming tufts. The pile fibers may be arranged (or spaced) to permit the transmission of light while also obstructing a view to the primary backing that acts as a substrate for disposition of the pile fibers. As described above, light may pass through the penetrable (or permeable) primary backing. The light may then be emitted as it passes through the pile fibers.

The light transmissive material 124 is constructed (or selected) to allow light to pass (or penetrate) through the material. In an embodiment of the present disclosure, the combination of pile fibers secured to a primary backing, and potentially including a secondary backing, forms a penetrable or permeable substrate and pile fibers with a density (or gauge), pile height, and twist level (and/or twist pattern) to prevent complete obstruction of light passing from at least the bottom surface of the primary backing through the pile fibers. In an example of the present embodiment, the pile fibers may also be a material (e.g., nylon) and/or color (e.g., a shade of white, beige, and/or gray) selected for their light transmission (or translucency) properties.

The light transmissive material 124 covers at least a portion of the outer surface to the light transmissive substrate 121. For example, as seen in FIG. 1, the light transmissive material 124 covers the entire outer surface of light transmissive substrate 121 to the housing 120. Furthermore, also as seen in the exemplary embodiment of FIG. 1, the light transmissive material 124 may cover at least a portion of the outer surface of a base 110. The light transmissive material 124 may be secured to an outer surface using means for fastening (e.g., stapling) and/or means for adhesion (e.g., glue). In other embodiments, the light transmissive material 124 may be secured to an outer surface using means for attaching (e.g., Velcro). In preferred embodiments of the present disclosure, in addition to be securable to an outer surface, the light transmissive material 124 is also replaceable. As a cover to the outer surface of the illuminated scratch post 100, the light transmissive material 124 may be worn down or damaged (e.g., through a high level of use by a household pet). The ability to remove the light transmissive material 124 enables an owner or user of the illuminated scratch post 100 to replace the light transmissive material 124 that is worn, frayed, or otherwise damaged.

In some embodiments, the light transmissive material 124 is disposed upon an outer surface of the light transmissive substrate 121 with pile fibers facing upward and contacting the air, while the primary backing faces downward (or inward) and contacts the outer surface of the light transmissive substrate 121. In other embodiments, the light transmissive material 124 is disposed upon an outer surface of the light transmissive substrate 121 with pile fibers facing upward and contacting the air, while the secondary backing faces downward (or inward) and contacts the outer surfaces of the light transmissive substrate 121.

Figure 4:
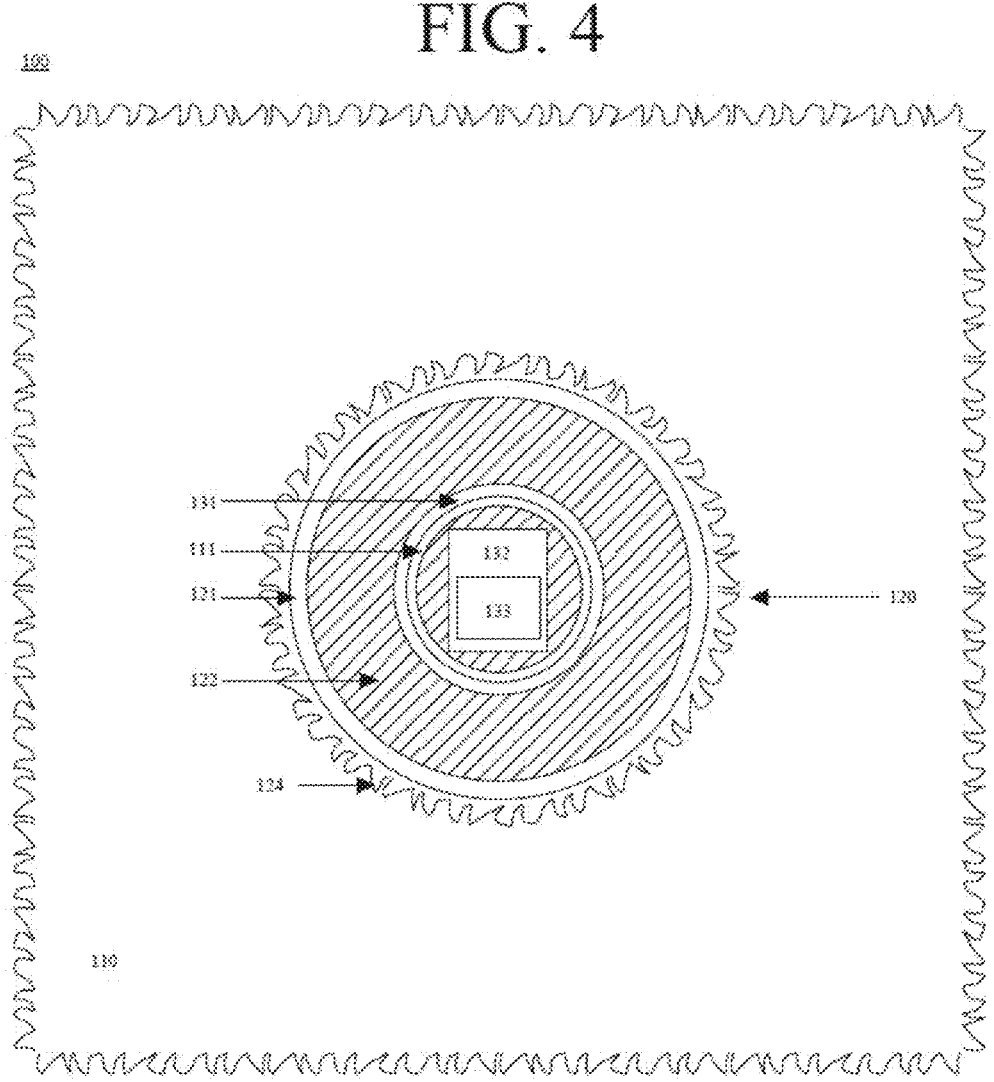
FIG. 4 is an interior cross-sectional top view of the illuminated scratch post.

Referring to exemplary embodiments of FIGS. 2A, 3 and 4, the integrated lighting device 130 comprises an adapter 132 (or AC/DC transformer) and wiring leading to one or more lighting elements 131. The adapter 132 provides AC/DC transformation for power from an electrical outlet or other electrical power source in order to power the integrated lighting device 130, including the one or more lighting elements 131. The one or more lighting elements 131 may use light sources that vary in color or are variable in color generation. The one or more lighting elements 131 may also be varied in lighting pattern through a control component 133 (described below). For example, a subset of light sources may turn on and off in a different pattern and/or at different times than another subset of light sources. The one or more lighting elements 131 may also use light sources that may be varied in lighting intensity through a control component 133 or potentiometer.

As seen in FIGS. 2A and 2B, the one or more lighting elements 131 are enclosed by the housing 120; however, in other embodiments of the present disclosure, a portion of the one or more lighting elements 131 may also be disposed upon an exterior surface of the housing 120 and/or base 110. Similarly, the adapter 132 is enclosed by the housing 120 in FIGS. 2A and 2B embodiments, but in other embodiments, the adapter 132 may be connected to the integrated lighting device 130 while being disposed on a surface outside of the enclosure from the housing 120.

In embodiments of the present disclosure, as seen in FIG. 3 and FIG. 4, the integrated lighting device 130 may comprise a control component 133 that connects with the one or more lighting elements 131 and the adapter 132. Furthermore, the control component 133 may be connected with one or more sensors 134 (e.g., temperature regulator, accelerometer, or motion sensor, as described below).

For example, the control component 133 may comprise an infrared (or IR) remote control component. In such embodiments, the illuminated scratch post 100 may have sensors 134 including an infrared input sensor disposed on an exterior surface of the housing 120 and/or base 110; the infrared input sensor may then be wired to the control component 133. In alternative exemplary embodiments, the control component 133 may comprise a wireless adapter that receives and transmits signals and/or data (e.g., using the Bluetooth wireless standard). In such embodiments, the illuminated scratch post 100 may have sensors 134 including an antenna disposed on an exterior surface of the housing 120 and/or base 110. In such embodiments, the antenna may be alternatively disposed on an internal surface of the housing 120 and/or base 110 (i.e., enclosed by the housing 120 and/or base 110). In either case, the sensor 134 that includes an antenna would then be wired to the control component 133.

In exemplary embodiments, the control component 133 may include processing components for handling commands generated by executing a program stored in the control component 133 to control the integrated lighting device 130. For example, the illuminated scratch post 100 may include sensors 134 (e.g., a button) disposed on an outer surface of the housing 120 and/or base 110 for receiving a user's input (e.g., pressing the button). The control component 133 may be connected to such sensor(s) 134, and the control component 133 may recognize inputs as a call to execute the program that controls the one or more lighting elements 131. Alternatively, where the illuminated scratch post 100 has sensors 134 that include either an infrared control component or wireless adapter, user input may be received from one or more remote operating devices (e.g., wirelessly sending a signal to the sensors 134). The control component 133 may be connected to such sensor(s) 134, and the control component 133 may recognize inputs as a call to execute the program that controls the one or more lighting elements 131.

In such examples, commands may be configured to generate (or produce) a lighting pattern through the lighting element(s) 131. Such a lighting pattern may be static (e.g., turning on lighting elements 131 to create the appearance of a circle through the light transmissive material 124). Such a lighting pattern may be dynamic (e.g., turning on and off lighting elements 131 to create the appearance of a "flashing" circle through the light transmissive material 124). Lighting patterns may also be a combination of static and dynamic through a period of time or an indefinite time.

Further still, the control component 133 may also include processing components for transmitting data collected through the integrated lighting device 130 to the one or more remote operating devices. For example, data transmitted by the control component 133 may include an indicator of whether the one or more lighting elements 131 are turned on or off. In another example, data transmitted by the control component 133 may include an indicator of how long the one or more lighting elements 131 have been turned on.

Figure 5:
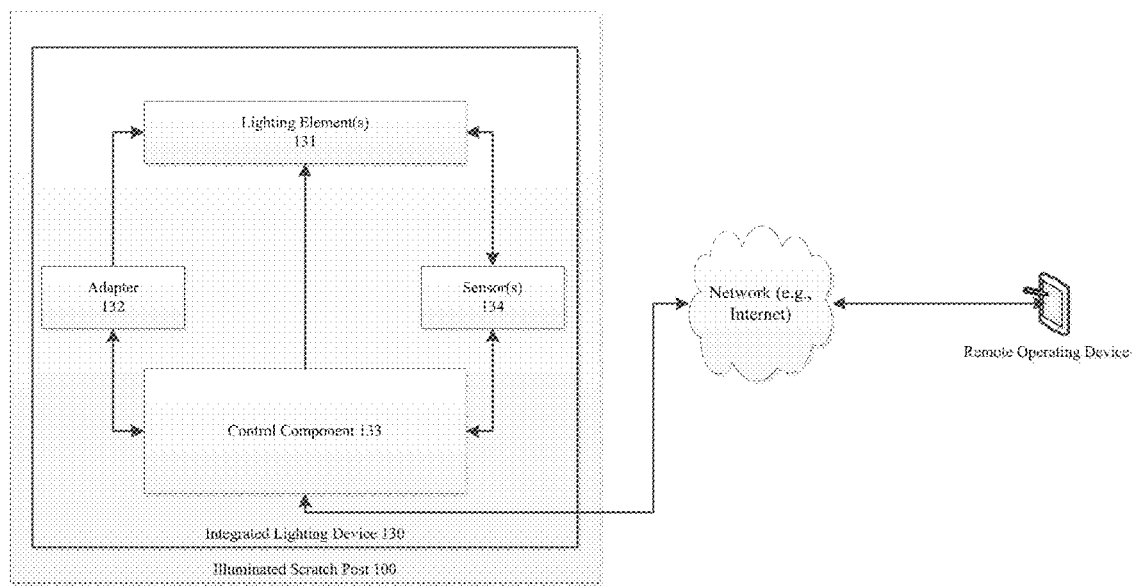
FIG. 5 is an exemplary embodiment of components comprising or connected to the integrated lighting device for the illuminated scratch post.

FIG. 5 is an exemplary embodiment of an illuminated scratch post 100 comprising a control component 133. In such an exemplary embodiment, the integrated lighting device 130 also comprises one or more sensors 134 and the control component 133 may connect to a network (e.g., the Internet) in order to communicate with a remote operating device. A remote operating device may be embodied by a smartphone, tablet, laptop, desktop, remote control, or other computing device communicatively coupled to the integrated lighting device 130 through the control component 133. For example, an end-user may use his or her smartphone to send a command to the control component 133 (e.g., through wireless communication) for turning on the integrated lighting device 130. Accordingly, in an embodiment of the present disclosure, the control component 133 may include a power storage component, such as a battery, to power the control component 133 despite power through the adapter 132 being turned off.

The control component 133 may comprise a digital integrated circuit and may include one or more general, commercial off-the-shelf computer processors. Alternatively, the control component 133 may comprise a programmable logic device configured for operating within the illuminated scratch post 100. In yet another alternative, the control component 130 may comprise an application specific integrated circuit (ASIC) designed for the illuminated scratch post 100. The control component 133 may also include one or more analog elements operating in concert with or in addition to the digital circuits; furthermore, a memory element for storing data, instructions, or both may be part of or associated with the control component 133.

The integrated lighting device 130 may comprise a switch connected to (or integrated with) the adapter 132 in order to power the integrated lighting device 130. The switch works with the adapter 132 to transfer power to the integrated lighting device 130, including the one or more lighting elements 131. In one embodiment, the switch may be disposed upon an exterior surface of the housing 120 and/or base 110. In another embodiment, the switch may be disposed along wiring between the adapter 132 and the electrical outlet or other power source (e.g., through a toggle switch or button). In any of the preceding embodiments detailing where the switch may be disposed, the switch is connected with a power source in order to switch the integrated lighting device 130 on and off.

The switch may also vary in its operating mechanism. In one embodiment, the switch could be a conventional mechanical switch (e.g., a lever that moves the switch between two or more positions). In another embodiment, the switch could be a remote-controlled switch (e.g., via infrared remote control) communicatively coupled with means for sending an electronic signal to change the state of the switch. In another embodiment, the switch could be timer-activated (e.g., with a set cycle to turn on the integrated lighting device 130 from 8 p.m. to 5 a.m. and to turn off the integrated lighting device 130 from 5 a.m. to 8 p.m.). In yet another embodiment, the switch may be any combination of these switch types.

Related to the switch, the integrated lighting device 130 may also include a potentiometer. The potentiometer may be used to adjust the setting and strength of light produced by the one or more lighting elements 131. In one embodiment, the potentiometer may have a fixed number of settings (e.g., 2 settings—lower light and maximum light). In another embodiment, the potentiometer may be an analog dial, rather than a switch with a fixed number of settings. In yet another embodiment, the potentiometer is connected (or integrated) with the switch such that changing the state of the switch may also change the state of the potentiometer (e.g., the switch has 3 settings: (1) off, (2) lower light, and (3) maximum light). In another embodiment, the potentiometer may connect between the adapter 132 and the one or more lighting elements 131, whereas the switch connects between the adapter 132 and the power source (e.g., electrical outlet) for the illuminated scratch post 100.

In accordance with embodiments having a switch and/or potentiometer, the control component 133 may interact with and control the switch and/or potentiometer through connections disposed through the adapter 132. The control component 133 may enable central control of sensors 134 affecting power being provided to the integrated lighting device 130.

For example, the integrated lighting device 130 may include sensors 134 that are one or more temperature regulators. A temperature regulator measures temperature (e.g., the temperature within the space encased by the housing 120) and/or power consumption (e.g., the length of time the integrated lighting device 130 has been turned on). With such measurements, the temperature regulator may communicate with the control component 133 to turn off power from the adapter 132 (e.g., if the temperature measurements exceeded a programmed threshold). Alternatively, in embodiments without the control component 133, the temperature regulator may be connected to cause a switch for the integrated lighting device 130 to turn off power from the adapter 132 (e.g., if temperature measurements exceeded a programmed threshold).

In another embodiment of the present disclosure, the integrated lighting device 130 may include sensors 134 that are one or more accelerometers. An accelerometer measures acceleration from one or more positions on the housing 120. With such measurements, the accelerometer could determine whether to turn off power from the adapter 132. For example, if a cat, household pet, or other force knocked the illuminated scratch post 100 from an upright position, then measurements captured by the accelerometer may signal for a control component 133 to turn off power provided through the adapter 132. Alternatively, in embodiments without the control component 133, the accelerometer may be connected to cause a switch for the integrated lighting device 130 to turn off power from the adapter 132.

In another embodiment of the present disclosure, the integrated lighting device 130 may include sensors 134 that are one or more motion sensors. The one or more motion sensors would register if/when a cat, other household pet, person, or any other object passed by the illuminated scratch post 100. Motion sensors may be paired with or include a timer for identifying when motion is detected.

When motion sensors are connected with the control component 133, a determination could be made whether to turn off power from the adapter 132. In one example, if motion is not detected by the one or more motion sensors for more than two hours, the control component 133 may control a switch to turn off power provided through the adapter 132. In another example, if motion is detected by the one or more motion sensors, the control component 133 may control a switch to turn on power provided through the adapter 132. In such embodiments, the one or more motion sensors may be disposed on an exterior surface of the base 110 and/or housing 120 and may be wired to the control component 133.

Alternatively, in embodiments without the control component 133, the motion sensors may be connected to cause a switch for the integrated lighting device 130 to turn on or turn off power from the adapter 132. In one example, if motion is not detected by the one or more motion sensors for more than two hours, the one or more motion sensors may be connected to cause a switch for the integrated lighting device 130 to turn off power provided through the adapter 132. In another example, if motion is detected by the one or more motion sensors, the one or more motion sensors may be connected to cause a switch for the integrated lighting device 130 to turn on power provided through the adapter 132. In such embodiments, the one or more motion sensors may be disposed on an exterior surface of the housing 120.

The sensors 134 included with the integrated lighting device 130 may collect data about interactions between a household pet and the illuminated scratch post 100. For example, sensors 134 that comprise motion sensors and/or accelerometers can, respectively, capture data on a household pet's proximity to the illuminated scratch post 100 and contact with the illuminated scratch post 100. The collected data from sensors 134 may be processed by the control component 133 in order for the control component 133 to control the integrated lighting device 130. Control may be of the duration the lighting elements 131 are turned on or off, the color of the light emanating from the lighting elements 131, and/or the pattern of lights turning on and off from the lighting elements 131. These activities encourage interaction between the household pet with the illuminated scratch post 100.

While not pictured in the figures, in addition or in the alternative to sensors 134, the integrated lighting device 130 may also comprise a sound device, which may connect with the control component 133. The sound device may produce audible sound effects or music of variable playing duration. The sound effects or music may complement and synchronize with patterns of lights turning on and off from the lighting elements 131, as displayed through the integrated lighting device 130. Sound effects may include, without limitation, sound recordings of insects chirping, animal noises (e.g., cats meowing), and other attention grabbing noises (e.g., a bell ringing). In some embodiments, sound recordings may be received by the control component 133 and played through the sound device, when the sound device is connected to the control component 133. Such recordings may be one or more persons' voices (e.g., a pet owner calling his or her cat by name). The incorporation and use of a sound device is another possible device that encourages pet interaction with the illuminated scratch post 100.

Figure 6:
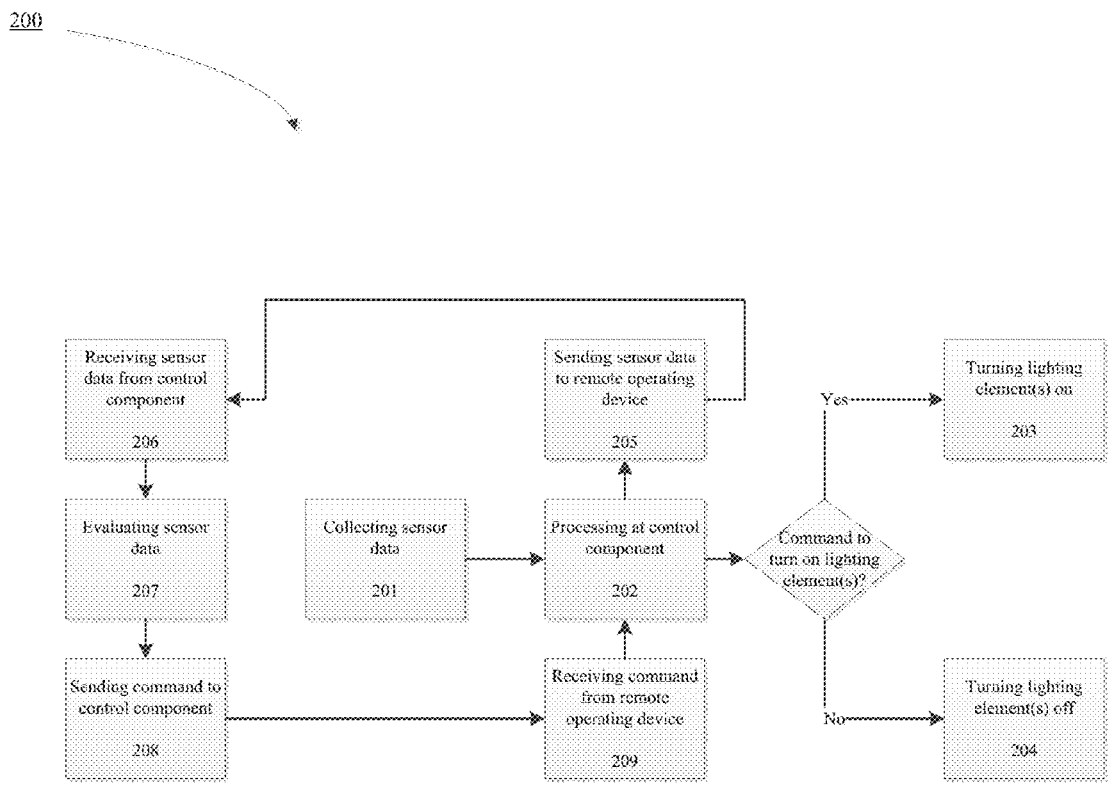
FIG. 6 is a flow chart diagram illustrating a method for turning on and off the integrated lighting device for the illuminated scratch post.

Referring to FIG. 6, there is a flow chart depicting a method 200 of controlling the integrated lighting device 130 through a control component 133 in an illuminated scratch post 100. The method may comprise collecting data from sensors 134 (Step 201) and transmitting that data to the control component 133. The control component 133 is processing data collected from sensors 134 (Step 202). In other embodiments, the control component 133 may also receive command data from a remote operating device (Step 209). In such embodiments, the control component 133 is also processing commands from the remote operating device (also at Step 202). The method 200 queries whether the data from sensors 134 and/or commands from a remote operating device indicate to turn on (or keep on) the one or more lighting elements 131. If the data or commands indicate to turn on (or keep on) the one or more lighting elements 131, then such action (or omission) will be taken through the control component 133 (Step 203). If the data or commands indicate to turn off (or keep off) the one or more lighting elements 131, then such action (or omission) will be taken through the control component 133 (Step 204).

Further disclosed in FIG. 6, where the control component 133 is in communication with a remote operating device, the control component 133 may cause data collected from sensors 134 to be sent to the remote operating device (Step 205). The remote operating device may then receive such data from the sensors 134 (Step 206). The remote operating device may evaluate the sensor data (Step 207), which may include processing and presenting the data to the user of the remote operating device to enable the user to determine whether he or she wants to take an action (e.g., sending a command to turn off or turn on the one or more lighting elements 131 of the integrated lighting device 130). The remote operating device may then send a command to the control component 133 of the integrated lighting device 130 at the illuminated scratch post 100 (Step 208). Thus, as stated above, the control component may receive commands from the remote operating device (Step 209) and process such commands, along with the data collected from the sensors 134, at Step 202.

It is understood that certain components described herein may be electrically coupled in a number of ways. Components may be electrically coupled by one or more physical wired connections. Components may be electrically coupled by one or more intangible wireless connections. Components may be electrically coupled by a combination of one or more physical wired connections and intangible wireless connections.

Terms like "top," "bottom," "above," and "below" relate to positions and arrangements that would result from an object being placed substantially flat on a substantially horizontal surface, where the object's bottom face is contacting such a surface or a surface substantially parallel to the substantially horizontal surface. Note, however, that this does not exclude the use of an object in other arrangements, such as against a post or in another, vertical arrangement.

Although the subject matter has been described in language specific to structural features and/or methodological acts, it is to be understood that the subject matter defined in the appended claim is not necessarily limited to the specific features or acts described above. Rather, the specific features and acts described above are disclosed as example forms of implementing the claim.

It is believed that the present disclosure and many of its attendant advantages will be understood by the foregoing description. It is also believed that it will be apparent that various changes may be made in the form, construction and arrangement of the modules and components thereof without departing from the scope and spirit of the disclosure or without sacrificing all of its material advantages. The form herein before described being merely an explanatory embodiment thereof, it is the intention of the following claims to encompass and include such changes.

What is claimed:

1. An illuminated scratch post for cats or other household pets comprising:
    a housing that includes a central lighting support disposed on an interior support surface of the housing and encased by a light transmissive substrate that defines a shape and structure to the housing; and
    an integrated lighting device disposed on an interior device surface of the housing and at least partially encased by the central lighting support, where
        the central lighting support extends through a hollow inner volume of the light transmissive substrate;
        one or more lighting elements from the integrated lighting device are disposed on an outward surface of the central lighting support, and
        at least a portion of an exterior surface to the housing is covered by a light transmissive material.

2. The illuminated scratch post in claim 1, wherein the one or more lighting elements from the integrated lighting device include a plurality of LEDs.

3. The illuminated scratch post in claim 1, wherein the light transmissive material has a primary backing as a substrate for securing pile fibers.

4. The illuminated scratch post in claim 1, wherein the integrated lighting device includes a control component connected with an infrared remote control component for turning power to the one or more lighting elements on and off.

5. The illuminated scratch post in claim 1, wherein the integrated lighting device includes a control component connected with a motion sensor for turning power to the one or more lighting elements on and off.

6. The illuminated scratch post in claim 1, wherein the integrated lighting device includes a switch for turning power to the one or more lighting elements on and off.

7. An illuminated scratch post for cats or other household pets comprising:
    a housing that includes a central lighting support disposed on an interior support surface of the housing and encased by a light transmissive substrate that defines a shape and structure to the housing;
    an integrated lighting device that is disposed on an interior device surface of the housing and at least partially encased by the central lighting support; and
    a control component comprising the integrated lighting device, where
        the control component is configured to receive commands from a remote operating device,
        the central lighting support extends through a hollow inner volume of the light transmissive substrate,
        one or more lighting elements from the integrated lighting device are disposed on an outward surface of the central lighting support, and
        at least a portion of an exterior surface to the housing is covered by a light transmissive material.

8. The illuminated scratch post in claim 7, wherein the one or more lighting elements from the integrated lighting device include a plurality of LEDs.

9. The illuminated scratch post in claim 7, wherein the light transmissive material has a primary backing as a substrate for securing pile fibers.

10. The illuminated scratch post in claim 7, wherein the control component is connected with temperature regulator for turning the one or more lighting elements off if one or more temperature measurements exceed a programmed threshold.

11. The illuminated scratch post in claim 7, wherein the control component is connected with an accelerometer for turning the one or more lighting elements off if one or more acceleration measurements exceed a programmed threshold.

12. The illuminated scratch post in claim 7, wherein the control component is connected with a motion sensor for turning power to the one or more lighting elements on and off.

13. The illuminated scratch post in claim 7, wherein the control component may receive commands from the remote operating device for producing one or more lighting patterns through the one or more lighting elements.

14. The illuminated scratch post in claim 7, wherein the integrated lighting device includes a switch for turning power to the integrated lighting device on and off.

15. A method of controlling an illuminated scratch post, the method comprising:
    collecting data from sensors in an integrated lighting device that is disposed on an interior device surface of a housing, where
        the housing includes a central lighting support disposed on an interior support surface of the housing and encased by a light transmissive substrate that defines a shape and structure to the housing; and
        one or more lighting elements from the integrated lighting device are disposed on an outward surface of the central lighting support;
    processing the data through a control component in the integrated lighting device; and
    controlling one or more lighting elements from the integrated lighting device based on results from processing the data.

16. The method of claim 15, wherein sensors include a temperature regulator for turning the one or more lighting elements off if one or more temperature measurements exceed a programmed threshold.

17. The method of claim 15, wherein sensors include an accelerometer for turning the one or more lighting elements off if one or more acceleration measurements exceed a programmed threshold.

18. The method of claim 15, wherein sensors include a motion sensor for turning power to the one or more lighting elements on and off.

19. The method of claim 15, wherein sensors include an infrared remote control component for turning power to the one or more lighting elements on and off.

20. The method of claim 15, further comprising producing one or more lighting patterns through the one or more lighting elements based on commands received through the control component from a remote operating device.

* * * * *